United States Patent [19]

Shaffstall et al.

[11] 4,215,712
[45] Aug. 5, 1980

[54] READY PRESSURE ATTACHMENT FOR EXISTING ANTI-G VALVES

[75] Inventors: Robert M. Shaffstall, San Antonio; Russell R. Burton, Stockdale; Jamy L. Jaggars, San Antonio, all of Tex.

[73] Assignee: The United States of America as represented by the Secretary of the Air Force, Washington, D.C.

[21] Appl. No.: 966,680

[22] Filed: Dec. 5, 1978

[51] Int. Cl.² .......................................... F16K 17/36
[52] U.S. Cl. .................................... 137/39; 128/1 A
[58] Field of Search .................... 2/2.1 A; 128/1 A; 137/38, 39

[56] References Cited

U.S. PATENT DOCUMENTS

| 2,591,030 | 4/1952 | Versoy | 137/39 |
| 2,952,264 | 9/1960 | Burns | 137/39 |
| 3,734,078 | 5/1973 | Cramer | 137/38 X |
| 3,956,772 | 5/1976 | Cox | 2/2.1 A |

Primary Examiner—Robert G. Nilson
Attorney, Agent, or Firm—Joseph E. Rusz; Arsen Tashjian

[57] ABSTRACT

An attachment for use with an anti-G valve to substantially decrease the inflation time of an anti-G garment. A spring loaded, adjustable tension lever arm provides a downward force on a pressure valve causing the anti-G garment to partially inflate. The increasing garment pressure is applied to a diaphragm which causes the lever arm to rise and balance the force of the spring which is normally adjusted to maintain the pressurized suit at 0.2 psig "Ready Pressure". The garment remains partially inflated until the anti-G valve operating in the conventional manner causes the garment to inflate in response to external G-forces.

4 Claims, 2 Drawing Figures

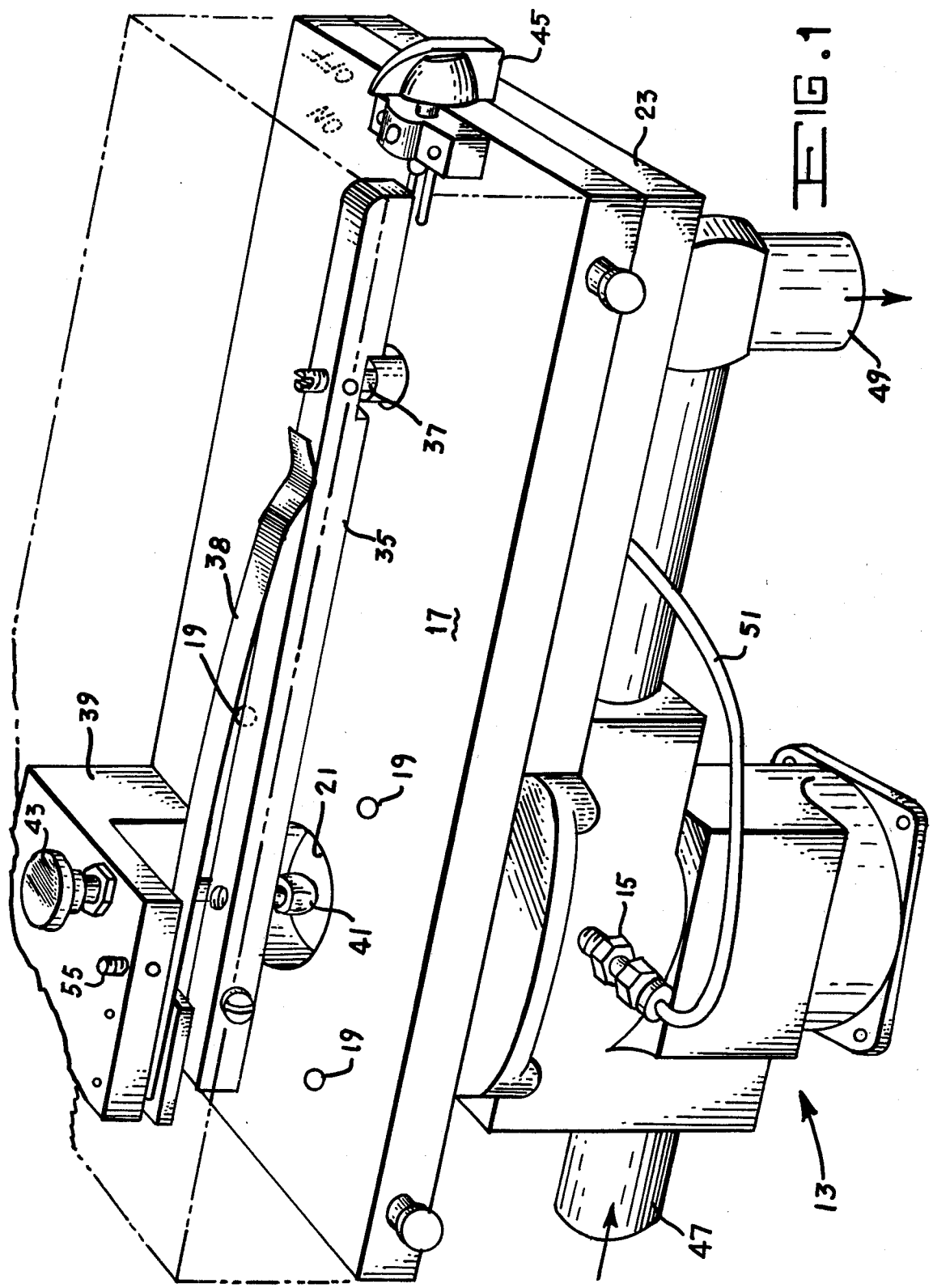

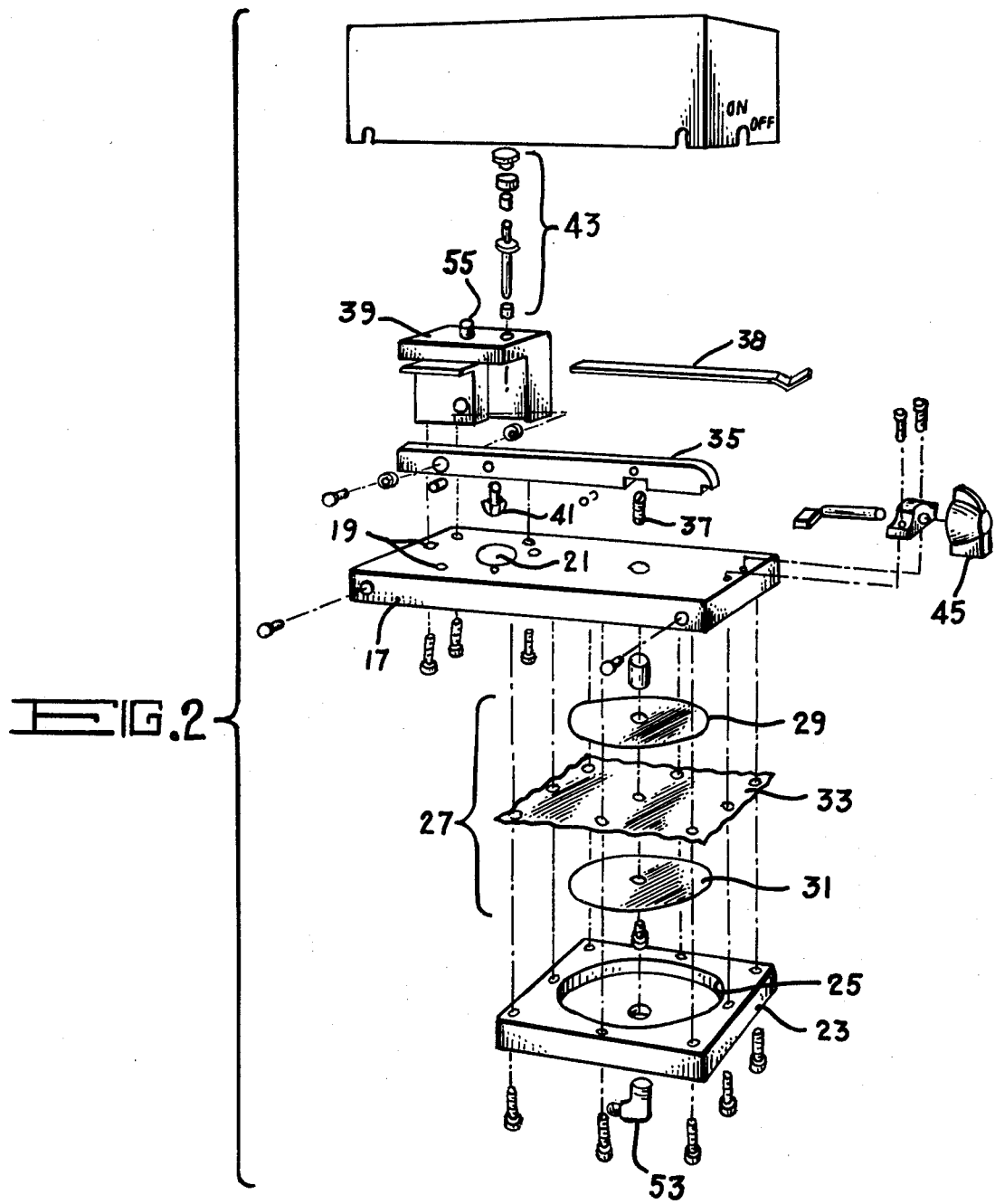

READY PRESSURE ATTACHMENT FOR EXISTING ANTI-G VALVES

STATEMENT OF GOVERNMENT INTEREST

The invention described herein may be manufactured and used by or for the Government for governmental purposes without the payment of any royalty thereon.

BACKGROUND OF THE INVENTION

This invention relates to an attachment suitable for use with a conventional anti-G valve in order to substantially decrease the inflation time normally required to overcome the effect of G forces on the pilot. The device is adjustable to provide "Ready Pressure" (pre-G inflation) at 1 G from 0.1 to 1 psig although 0.2 psig appears to be the most favored by pilots. As 2 G conditions are approached, the ready pressure device becomes inoperative and the G-valve operates in the conventional manner. Ready pressure can be eliminated with an on/off switch on the device if not needed or desired by the pilot.

The use of highly maneuverable fighter/interceptor aircraft with high sustained G capability has identified deficiencies in presently available acceleration systems. The anti-G suit and inflation valve now in use has remained basically unchanged for decades although the performance of aircraft has been increasing steadily. The standard suit pressurization rate has been found adequate for 1 G/sec acceleration onset rates. However, it is well known that newer fighter aircraft such as the F-15 are capable of several G/sec onset rates and the G-valve has been found deficient during rapid G-loading. At these more rapid G-onset rates, the standard USAF Alar anti-G valve, which is commercially available from Alar Products Inc., 7016 Euclid Avenue, Cleveland, Ohio 44103, performed poorly in that it did not support the subject early in the high-G profile.

Existing anti G garments are made up of inflatable bladders what, when inflated, apply pressure to the abdomen and legs of the wearer. The present valves automatically start this inflation at +2 $G_z$ and supply 1.5 psig/G above this level. The eleven liters of air required to just fill an empty suit causes a significant lag between the onset of G and a rise in suit pressure. The application of 0.2 psig "ready pressure" would account for 60% of this air volume and not be uncomfortable thereby significantly reducing inflation time. The hereinafter described invention decreases the inflation time of the anti G garment by applying the "ready pressure" prior to the onset of G and may be turned on and off at the wearer's discretion while not interfering with the standard pressure profile of the valve.

SUMMARY OF THE INVENTION

The invention is concerned with providing an attachment suitable for decreasing the inflation time of an anti G garment by filling it to 0.2 psig prior to the onset of G. A separate large diaphragm opposes and balances a spring force which produces a "ready pressure". A leaf spring applies downward force to a pivotably mounted lever which directs this force to a "press-to-test" button on a conventional G valve causing the valve to open and allow air to flow into the suit until the desired "ready pressure" is reached. This pressure is also applied to the lower side of a diaphragm which is in operative communication with the pivotably mounted lever causing it to move upward against the force of the leaf spring. When the two forces are in balance, the desired "ready pressure" in the suit has been reached and the valve can function in its normal manner to compensate for fast changes in cockpit altitude and aircraft orientation to the earth G field.

Accordingly, it is an object of the invention to provide a device suitable for attachment to a G-valve for decreasing the inflation time of an anti G garment by filling it to 0.2 psig prior to the onset of G.

Another object of the invention is to provide an attachment for a G-valve which provides "ready pressure" prior to onset of G and which can be turned on or off at the discretion of the wearer. When in the "off" position, the attachment does not interfere with the standard profile of the valve.

Still another object of the invention is to provide a "ready pressure" attachment which includes a separate large diaphragm to oppose and balance a spring force which produces the "ready pressure".

A further object of the invention is to provide an attachment to a G valve which permits the G garment to be filled to 0.2 psig "ready pressure" which accounts for 60% of the air necessary for pressurizing the garment at +2 G. This significantly reduces the inflation time and is not uncomfortable.

These and other objects, features and advantages will become more apparent after considering the following detailed description taken in conjunction with the annexed drawings and appended claims.

BRIEF DESCRIPTION OF THE DRAWINGS

FIG. 1 is an enlarged view in perspective of a G valve with the ready pressure device attached thereto according to the invention showing the leaf spring and lever arrangement which controls the pre-G inflation of the garment; and FIG. 2 is an exploded view of the details of the diaphragm arrangement which forces the lever upward against the leaf spring in response to pressure in the system.

DESCRIPTION OF A PREFERRED EMBODIMENT

Referring now to the drawings in which like reference numerals refer to similar elements in each of the views, there is shown an Alar Anti-G valve 13 manufactured by Alar Products, Inc. of Cleveland, Ohio. The valve 13 has been modified by increasing the size of several ports within the valve in order to increase the rate of air flow by decreasing its resistance to air flow. In the modified valve 13 called a "Hi-flow" valve, the rate of air flow was increased approximately 50%. Another modification of the valve 13 is the provision of a port 15 which is closable by a plug (not shown). This arrangement allows the ready pressure attachment to be removable so that the valve 13 can be returned to its normal operating conditions.

The ready pressure attachment includes a base plate 17 adapted for installation on the upper surface of the G valve 13 by the use of extra length screws in the openings 19 which thread into the cover of the G valve and hold the base plate 17 in position. An opening 21 in the base plate 17 allows access to the "press-to-test" button on the G valve 13. A portion of the base plate 17 extends outwardly and includes a circular opening (not shown) in the lower surface thereof. A cover plate 23 with a corresponding circular opening 25 in the upper surface thereof is in alignment with the circular opening in the base plate 17. A diaphragm assembly 27 including an upper support disc 29 and a lower support disc 31 is positioned in the aligned circular openings in the base plate 17 and cover plate 23 with a diaphragm 33 positioned therebetween and vertically movable therein.

A lever 35 is pivotably mounted on the upper surface of the base plate 17 with one end directly over the diaphragm assembly 27 for movement in response to corresponding vertical movement thereof. A short rod 37 is in direct communication with the diaphragm assembly 27 and the lever 35 so that the corresponding movements can be transmitted. A leaf spring 38 is mounted on the block 39 and presses against the upper surface of the lever 35 urging it downward against the diaphragm assembly 27. A knob 41 extending downward through the opening 21 in the base plate 17 is also urged downward by the pressure of the leaf spring 38 on the lever 35. The knob 41 operates to open the "press-to-test" button on the G valve as the lever 35 moves downward causing air to flow into the G garment. An auxiliary "press-to-test" button 43 is installed in the block 39 so that the G valve 13 and G garment can be tested in the usual manner.

In operation, with the switch 45 in the "on" position (as shown), the leaf spring 38 applies a downward force to the lever 35 which directs this force through the knob 41 to the "press-to-test" button on the G valve. This causes air to flow through the G valve from the inlet 47 to the outlet 49 and into the anti G garment. The pressure developed in the anti G garment is seen at port 15 and applied to the lower side of the diaphragm 33 through the tubing 51 and fitting 53. This causes the rod 37 to be raised upward causing the lever 35 to oppose and balance the force of the leaf spring 38. The spring 38 can be adjusted at screw 55 to attain the desired pressure of approximately 0.2 psig.

The ready pressure attachment can be made inoperative by turning the switch 45 to the "off" position causing the lever 35 with the knob 41 to move upward away from the "press-to-test" button on the G valve. The auxiliary "press-to-test" button 43 which extends outside the cover of the ready pressure attachment can be used to test the G valve in the normal manner with the switch 45 in the "off" position.

Although this invention has been illustrated in the accompanying drawings and described in the foregoing specification in terms of a preferred embodiment thereof, the invention is not limited to this embodiment. It will be apparent to those skilled in the art that the hereinbefore described ready pressure attachment can be used with other pressure control valves to apply an initial pre-inflation pressure to an enclosed area. Also, it should be noted that certain changes, modifications and substitutions can be made in the construction details of the invention without departing from the true spirit and scope of the appended claims.

Having thus described the nature of our invention, what we claim and desire to secure by Letters Patent of the United States is:

1. A ready pressure attachment for use on an anti G garment having a G valve with a "press-to-test" button on the upper portion thereof, said attachment comprising a base plate of substantially rectangular configuration attached to the upper portion of the G valve, said base plate having an access opening over the "press-to-test" button on the G valve, a cover plate fixedly attached to the outer portion of the lower surface of said base plate, complementary circular openings in the lower surface of said base plate and the upper surface of said cover plate, a diaphragm assembly positioned in said circular openings for vertical movement in response to changes in pressure in the anti G garment, a pivotably mounted lever on the upper surface of said base plate, the outer end of said lever being positioned directly over said diaphragm assembly for vertical movement in response to corresponding vertical movement of the diaphragm assembly, a leaf spring mounted over said lever for applying a downward force thereon, and a knob mounted near the inner end of said lever over the access opening in said base plate whereby the downward force on said lever causes said knob to activate the "press-to-test" button on the G valve and allow to flow into the anti G garment until the pressure is raised to a predetermined desired level causing the diaphragm assembly and lever to move upward to oppose and balance the force of the leaf spring while closing the "press-to-test" button on the G valve.

2. The attachment for use with the anti G garment G valve as defined in claim 1 wherein the diaphragm assembly includes an upper support disc, a lower support disc and a diaphragm juxtapositioned therebetween, and a rod positioned between the diaphragm assembly and the lever for transmitting the vertical movements in response to pressure changes in the anti G garment.

3. The attachment for use with the anti G garment G valve defined in claim 2 wherein a block is mounted on the upper surface of said base plate near the access opening therein, and an auxiliary press-to-test button mounted in said block whereby downward pressure on the auxiliary "press-to-start" button activates the "press-to-test" button on the G valve.

4. The attachment for use with the anti G garment G valve defined in claim 3 wherein an adjustment screw is positioned in the block on said base plate, said adjustment screw operating to control the force applied to said lever by said leaf spring thereby controlling the ready pressure in the anti G garment.

* * * * *